Feb. 15, 1966 M. KARNAUGH 3,235,746
NONSATURATING TRANSISTOR SWITCHING CIRCUIT
Filed Oct. 11, 1960 2 Sheets-Sheet 1

INVENTOR
M. KARNAUGH
BY Lucian C. Canepa
ATTORNEY

INVENTOR
M. KARNAUGH
BY Lucian C. Canepa
ATTORNEY

United States Patent Office 3,235,746
Patented Feb. 15, 1966

3,235,746
NONSATURATING TRANSISTOR SWITCHING CIRCUIT

Maurice Karnaugh, Warren Township, Somerset County, N.J., assignor to Bell Telephone Laboratories, Incorporated, New York, N.Y., a corporation of New York
Filed Oct. 11, 1960, Ser. No. 62,011
6 Claims. (Cl. 307—88.5)

This invention relates to current-limiting networks, and more particularly to nonsaturating transistor switching circuits including such networks.

When the input or driving current applied to a switching transistor is cut off, the output current thereof does not immediately fall from its maximum to its minimum value but remains instead almost at its maximum value for a finite period of time before decaying to the minimum value. This finite period is called the storage or saturation delay time and results from injected minority carriers being in the base region of the transistor at the moment when the input current is cut off. These carriers require a definite length of time to be collected, which time is a function of the degree of saturation into which the transistor is driven and of the time spent therein.

Maintaining a switching transistor out of saturation decreases the storage time thereof and results in decreased turn-off times therefor, thereby increasing the pulse repetition rate at which the transistor may be driven. Accordingly, for high speed switching applications, it is highly advantageous that a driven transistor be maintained out of saturation.

An object of the present invention is the improvement of current-limiting networks.

More specifically, an object of this invention is the provision of improved nonsaturating transistor switching circuits.

These and other objects of the present invention are realized in a specific illustrative embodiment thereof which includes a switching transistor having an output path in which is connected a network including a voltage-controlled negative resistance diode in parallel with a masking resistor, the value of the resistor being selected to substantially exactly mask or balance out the negative resistance portion of the characteristic curve of the diode, thereby providing a current-limiting arrangement whose characteristic exhibits an extended constant current region at a value corresponding to a less-than-saturation condition of the transistor. In this way, the transistor is simply and effectively maintained out of saturation during its switching cycle of operation.

It is a feature of the present invention that a transistor include in its output path a current-limiting network which comprises a voltage-controlled negative resistance diode having connected thereto a resistance element that masks the negative resistance portion of the characteristic curve of the diode to modify the curve to include therein an extended region of constant current.

It is another feature of the invention that a current-limiting network include a voltage-controlled negative resistance diode connected in parallel with a masking resistor.

A complete understanding of the present invention and of the above and other features and advantages thereof may be gained from a consideration of the following detailed description of an illustrative embodiment thereof presented hereinbelow in connection with the accompanying drawing, in which.

A great variety of electronic devices and circuits exhibit negative resistance characteristics and it has long been known that such negative resistance characteristics may have one of two forms. The current-controlled negative resistance device, which is referred to as open-circuit stable, is characterized by zero-resistance turning points. The voltage-controlled negative resistance device, which is referred to as short-circuit stable, is the dual of the current-controlled negative resistance device, and is characterized by zero-conductance turning points. The thyratron and dynatron are examples of devices which respectively exhibit current-controlled and voltage-controlled negative resistance characteristics.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, volume 109, January-March 1958, pages 603–604; "Tunnel Diodes as High-Frequency Devices," H. S. Sommers, Jr., Proceedings of the Institute of Radio Engineers, volume 47, July 1959, pages 1201–1206; and "High-Frequency Negative-Resistance Circuit Principles for Esaki Diode Applications," M. E. Hines, The Bell System Technical Journal, volume 39, May 1960, pages 477–513.

The tunnel diode comprises a P–N junction having an electrode connected to each region thereof, and is similar in construction to other semiconductor diodes used for such various purposes as rectification, mixing, and switching. The tunnel diode, however, requires two unique characteristics of its P–N junction; that it be narrow (the chemical transition from N-type to P-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Figure 1:
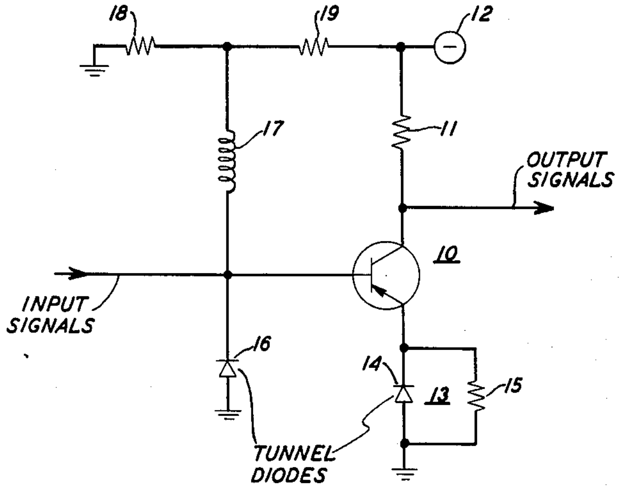
FIG. 1 is a schematic showing of a specific illustrative nonsaturating transistor switching circuit embodying the principles of the present invention.

Referring now to FIG. 1, there is shown a switching circuit including a P–N–P transistor 10 whose collector electrode is connected through an output or load resistor 11 to a collector bias source 12 and whose emitter electrode is connected through a current-limiting network 13 to ground, the network 13 including a tunnel diode 14 connected in parallel with a masking resistor 15.

Input switching signals are applied to the base electrode of the transistor 10, which base electrode is connected to ground via an input tunnel diode 16. Also, the base electrode is connected to ground through an inductor 17 and a resistor 18. Furthermore, the inductor 17 is connected through a resistor 19 to the bias source 12.

Output signals are derived from the switching circuit shown in FIG. 1 from the collector electrode of the transistor 10 with respect to ground. The complete circuit path interconnecting the collector and emitter electrodes of the transistor 10 is termed herein the "output path" of the circuit.

Figure 2:
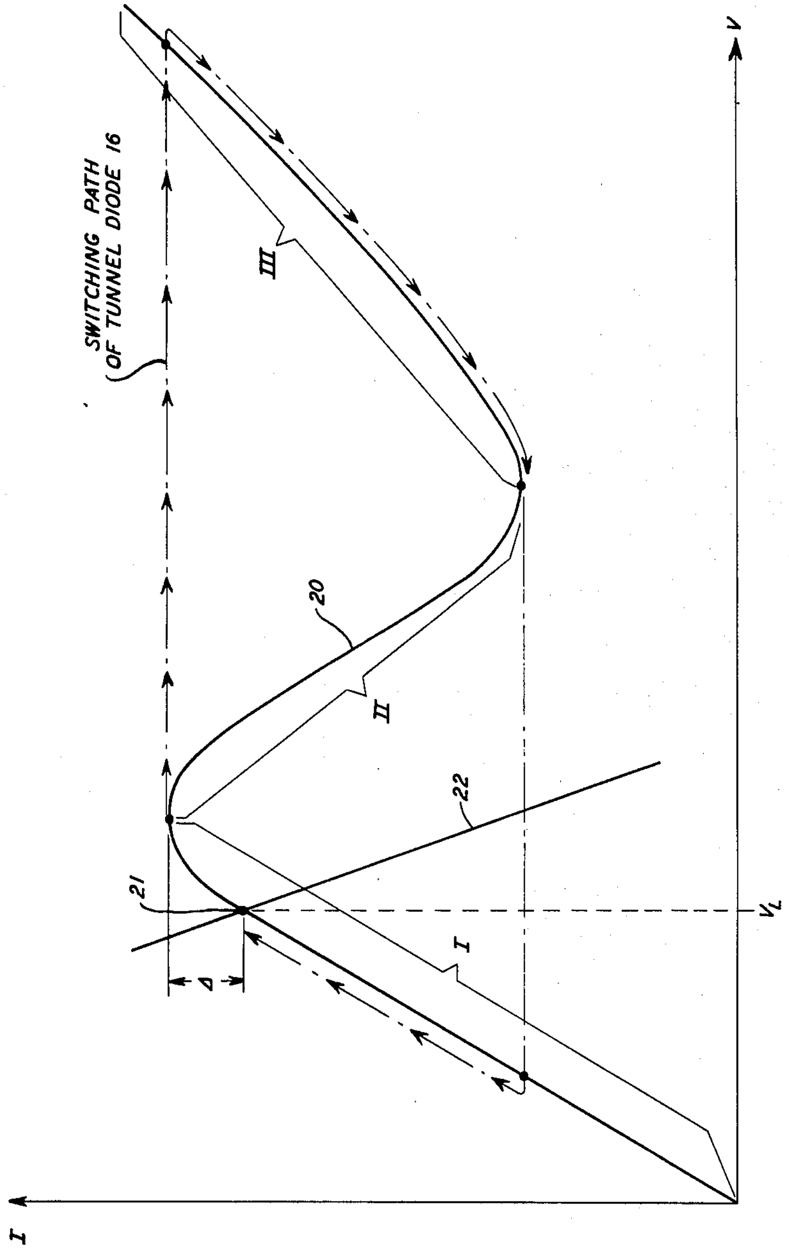
FIG. 2 is a graphical depiction helpful to an understanding of the operation of the switching circuit shown in FIG. 1.

As shown in FIG. 2, the characteristic curve 20 of the input tunnel diode 16 comprises a relatively low voltage positive resistance region I, a negative resistance region II, and a realtively high voltage positive resistance region III. The diode 16 may be biased for astable, monostable, or bistable operation, depending upon the selection of values for the source 12 and the resistors 18 and 19. Assume, for illustrative purposes, that the diode 16 is biased for monostable operation at a stable operating point 21 which is defined by the intersection of a load line 22 with the relatively low voltage region I of the characteristic curve 20.

The relatively low voltage $V_L$ which corresponds to the operating point 21 of the characteristic curve 20 of FIG. 2 is selected to be insufficient to cause injection of carriers from the emitter region into the base region of the transistor 10. Accordingly, substantially no current carriers are then available to be collected at the collector electrode of the transistor 10, the collector-to-emitter impedance thereof is relatively high and, as a result, the voltage appearing between the collector electrode and ground is also relatively high.

When, however, an input current signal of an amplitude greater than Δ is applied to the circuit of FIG. 1, the diode 16 is triggered in a well-known manner to undergo a regenerative switching cycle whose excursion is indicated in FIG. 2 by dot-dash lines. During that portion of the excursion which extends over the relatively high voltage region III of the characteristic curve 20, the voltage across the base-to-emitter junction of the transistor 10 is sufficient to cause an output current to flow through the load resistor 11. Under such conditions, the voltage appearing between the collector electrode and ground is relatively low.

During the time in which the switching transistor 10 conducts, the current therethrough is limited by the network 13 to a value that corresponds to a less-than-saturation condition of the transistor. The ability of the network 13 to effectively limit the current through the transistor 10, thereby permitting rapid switching thereof, can be best understood by reference to FIG. 3 wherein the characteristic curve of the tunnel diode 14 of the network 13 is depicted in an idealized piecewise linear fashion.

Herein, whenever reference is made to the ohmic value of the negative resistance portion of the characteristic curve of a tunnel diode, it is to be understood that what is meant is the resistance value represented by the linear segment which approximates the slightly curvilinear negative resistance portion of such a characteristic.

Figure 3:
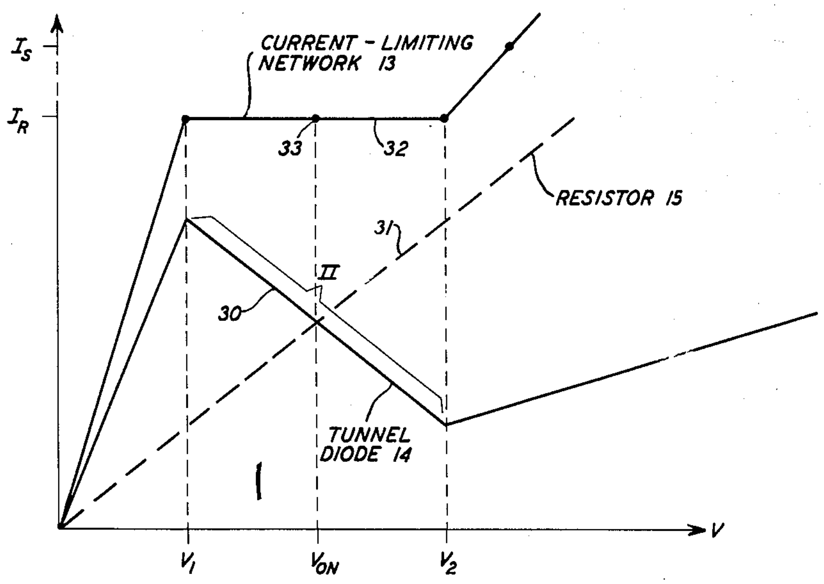
FIG. 3 illustrates the voltage-current characteristic curve of the current-limiting network included in the circuit of FIG. 1 and, also, depicts the individual characteristic curves of the elements out of which the network is formed.

The idealized characteristic 30 of the tunnel diode 14 of the network 13 is shown in FIG. 3 as including a negative resistance portion II. Also, FIG. 3 depicts the characteristic 31 of the resistor 15 that is connected in parallel with the diode 14. The resistor 15 is selected so that its absolute value is equal to the absolute resistance value of the diode 14 over the negative resistance portion II of the characteristic 30. More specifically, the slope of the characteristic 31 is chosen to be equal and opposite in orientation to that of the portion II. As a result, the resistor 15 exactly masks or compensates for the negative resistance region of the diode 14, whereby the idealized composite characteristic 32 of the network 13 exhibits a constant current portion between the voltage values designated $V_1$ and $V_2$ on the abscissa of FIG. 3.

As a practical matter, the negative resistance portion II of the characteristic 30 of FIG. 3 is not truly linear but exhibits instead a slight amount of curvature. Accordingly, that portion of the composite characteristic 32 which extends between the voltage values $V_1$ and $V_2$ is not exactly horizontal. Nevertheless, by means of the masking resistor 15 it is possible to provide an effective current-limiting network characterized by an extended region of substantially constant current at a regulated value $I_R$ which corresponds to a less-than-saturation condition of the driven transistor 10. It is noted that the current corresponding to a saturation condition of the transistor 10 may, for example, be represented as occurring at the value marked $I_S$ on the current scale of FIG. 3.

Advantageously, the values of the collector bias source 12 and the load resistor 11 of the circuit shown in FIG. 1 are so selected that when the transistor 10 is turned on, the voltage across the current-limiting network 13 assumes the value $V_{on}$ which, as indicated on the composite characteristic 32 illustrated in FIG. 3, corresponds to an operating point 33 midway between the voltage values $V_1$ and $V_2$. In this way, undesired transient variations in the input signals are ineffective, over an extended range of voltages, to drive the switching transistor 10 into saturation, regardless of the polarity of such variations.

Alternatively, to meet specific conditions in which input signal variations are more likely to be of one polarity than the other, the operating point of the network 13 may, of course, by proper choice of circuit parameters, be selected to fall to the left or to the right of the point 33 on the composite characteristic 32 of FIG. 3.

It is emphasized that although particular attention herein has been directed to the use of a tunnel diode as the component 14 of the current-limiting network 13 shown in FIG. 1, other two-terminal voltage-controlled negative resistance assemblies may also be used therefor.

Furthermore, it is to be understood that the above-described arrangements are only illustrative of the application of the principles of the present invention. Numerous other arrangements may be devised by those skilled in the art without departing from the spirit and scope of the invention.

What is claimed is:

1. In combination in a transistor switching circuit, a transistor having two output electrodes, an output path connected between said electrodes, a voltage-controlled negative resistance diode, characterized by a negative resistance of —R units in a bounded conduction range, included in series in said path, and masking means connected in parallel with said diode and characterized by a real impedance component of substantially +R units.

2. A combination as in claim 1 wherein said diode is a tunnel diode.

3. In combination in a transistor switching circuit, a transistor having two output electrodes, an output path connected between said electrodes, a tunnel diode included in series in said path, and means connected to said diode for substantially exactly masking the negative resistance portion of its characteristic curve, wherein said masking means is a resistor connected in parallel with said diode.

4. In combination in a transistor switching circuit, a transistor having two output electrodes, an output path interconnecting said electrodes, and a current-limiting network included in series in said path, said network comprising a voltage-controlled negative resistance diode and a masking resistor connected in parallel therewith, the resistor having an ohmic value of the same magnitude as that which said diode exhibits over the negative resistance portion of its characteristic curve.

5. In combination in a transistor switching circuit, a transistor having emitter and collector output electrodes, an output path interconnecting said electrodes, a tunnel diode connected directly to said emitter electrode and being in series in said output path, and a resistor connected in parallel with said diode for substantially exactly masking the negative resistance portion of the characteristic curve of said diode.

6. A transistor amplifier, comprising two voltage supply leads, a transistor having an emitter circuit connected to one of said leads, a collector circuit connected to said other lead, a negative feedback coupling connected in said emitter circuit and comprising an ohmic resistor and a tunnel diode connected in parallel to said resistor, said tunnel diode having a current-voltage characteristic with a negative portion, and said resistor having a linear current-voltage characteristic matched to said tunnel diode characteristic so as to intersect said negative portion, a base on said transistor for receiving an input signal voltage applied to said base and said feedback coupling.

References Cited by the Examiner

UNITED STATES PATENTS 3,090,926 5/1963 Engel ------------ 307—88.5 X

OTHER REFERENCES

"Wave Generation and Shaping," by Leonard Strauss, McGraw-Hill Book Co. Inc., 1960.

IBM Technical Disclosure Bulletin, I. G. Akmenkalns, vol. 2, No. 5, February 1960.

Verman: "Negative Circuit Constant," Proceedings, Institute of Radio Engineers, April 1931, 19:676 to 681.

ARTHUR GAUSS, *Primary Examiner.*

HERMAN KARL SAALBACH, GEORGE N. WESTBY, *Examiners.*